(12) United States Patent
Liu et al.

(10) Patent No.: US 11,886,162 B2
(45) Date of Patent: Jan. 30, 2024

(54) METHOD FOR IDENTIFYING PITCH ERROR AND YAW ERROR OF NUMERICALLY-CONTROLLED (NC) MACHINE TOOL

(71) Applicant: GUANGDONG OCEAN UNIVERSITY, Zhanjiang (CN)

(72) Inventors: Huanlao Liu, Zhanjiang (CN); Jialin Hou, Zhanjiang (CN); Yulin Wang, Zhanjiang (CN); Can Liu, Zhanjiang (CN); Chuanjing Zhang, Zhanjiang (CN); Qunlong Zhou, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 18/309,422

(22) Filed: Apr. 28, 2023

(65) Prior Publication Data

US 2023/0266737 A1 Aug. 24, 2023

Related U.S. Application Data

(63) Continuation of application No. PCT/CN2022/142202, filed on Dec. 27, 2022.

(30) Foreign Application Priority Data

Feb. 23, 2022 (CN) .......................... 202210171025.2

(51) Int. Cl.
*G05B 19/402* (2006.01)
*G05B 19/404* (2006.01)

(52) U.S. Cl.
CPC ......... *G05B 19/402* (2013.01); *G05B 19/404* (2013.01)

(58) Field of Classification Search
CPC ........................... G05B 19/402; G05B 19/404
See application file for complete search history.

(56) References Cited

U.S. PATENT DOCUMENTS

2011/0040523 A1* 2/2011 Matsushita .......... G01B 21/045
702/152
2011/0246115 A1* 10/2011 Hon ....................... G01B 7/008
702/95

(Continued)

FOREIGN PATENT DOCUMENTS

CN 103447884 A 12/2013
CN 103737426 A 4/2014

(Continued)

*Primary Examiner* — Kenneth M Lo
*Assistant Examiner* — Mohammed Shafayet

(57) ABSTRACT

A method for identifying pitch error and yaw error of a numerically-controlled (NC) machine tool, including: acquiring a Cartesian coordinate system of a target machine tool; setting each axis of the Cartesian coordinate system as movement axis, where each movement axis has three measurement trajectories, and the three measurement trajectories are mutually parallel to the corresponding axis, and not on the same plane; selecting an axis as the movement axis; and obtaining positioning error data between an actual operation measurement point and an ideal operation measurement point of the target machine tool when the target machine tool moves along the three measurement trajectories corresponding to the movement axis; and according to spatial angle geometric relationship and the positioning error data, obtaining a pitch error angle and a yaw error angle of the target machine tool.

6 Claims, 7 Drawing Sheets

(56) References Cited

U.S. PATENT DOCUMENTS

| | | | | |
|---|---|---|---|---|
| 2012/0215342 A1* | 8/2012 | Gu | ...................... | G05B 19/401 |
| | | | | 700/192 |
| 2013/0282328 A1 | 10/2013 | Sato | | |
| 2017/0297160 A1* | 10/2017 | Matsushita | ........ | B23Q 17/2428 |
| 2020/0109942 A1* | 4/2020 | Chang | ................ | G05B 19/4086 |

FOREIGN PATENT DOCUMENTS

| | | | |
|---|---|---|---|
| CN | 103745098 A | 4/2014 | |
| CN | 105538038 A | 5/2016 | |
| CN | 107806825 A | 3/2018 | |
| CN | 112008492 A | 12/2020 | |
| CN | 113093649 A | 7/2021 | |
| CN | 113211185 A | 8/2021 | |
| CN | 113910001 A | 1/2022 | |
| CN | 114578754 A | 6/2022 | |
| JP | 2016218746 A | 12/2016 | |
| KR | 20190036111 A | 4/2019 | |
| WO | 2017055637 A1 | 4/2017 | |

* cited by examiner

METHOD FOR IDENTIFYING PITCH ERROR AND YAW ERROR OF NUMERICALLY-CONTROLLED (NC) MACHINE TOOL

CROSS-REFERENCE TO RELATED APPLICATIONS

This application is a continuation of International Patent Application No. PCT/CN2022/142202, filed on Dec. 27, 2022, which claims the benefit of priority from Chinese Patent Application No. 202210171025.2, filed on Feb. 23, 2022. The content of the aforementioned applications, including any intervening amendments thereto, are incorporated herein by reference.

TECHNICAL FIELD

This application relates to manufacturing and processing of numerically-controlled (NC) machine tools, particularly to geometric error measurement and angular error identification of the NC machine tools, and more particularly to a method for identifying pitch error and yaw error of a NC machine tool.

BACKGROUND

Currently, there are various methods for measuring and identifying geometric errors of machine tools. In some strategies, the identification of positioning error is not considered to reduce the selection of error measurement points. In order to collect more geometric error identification data, redundant measurement and identification are performed in some methods for the positioning error and angular error. Moreover, the linear fitting of the actual measured distance is adopted to obtain the error between the actual distance and the ideal distance. The above-mentioned error measurement and identification methods are established on the basis of the identification of the pitch error and yaw error. However, the identification of pitch error and yaw error still adopts a traditional method proposed at the beginning of this century. The traditional method is no longer suitable for the current geometric error measurement and identification.

Chinese Patent Application No. 201710912171.5 published on Mar. 16, 2018 disclosed a three-sided five-line method for measuring and identifying spatial geometric errors of machine tools based on plane grating, which included designing and planning a measurement path in the measurement range of the plane grating in each of the three measurement planes XOY, XOZ and YOZ; identifying the errors in the XOY, XOZ and YOZ planes in turn, where the perpendicularity error between two axes on the measurement plane is first identified, and after eliminating the influence of the perpendicularity error, the pitch error and yaw error are identified according to the relationship between different trajectories; after eliminating the influence of angular errors, the positioning error and straightness error are identified; the identified errors of the three measurement planes are combined and input into the model to obtain the roll angle error; and performing parametric modeling on each geometric error term, and plotting an error curve of each geometric error term by means of orthogonal polynomial fitting, so as to realize the identification of the spatial geometric errors. However, the traditional method requires multiple measurements of the positioning error of three to four parallel lines in the same coordinate axis plane for identification of the pitch error and yaw error, and it also needs to select a plane parallel to the coordinate system plane for measurement. Thus, the existing methods are greatly limited in the practical application.

SUMMARY

An objective of this application is to provide a method for identifying pitch error and yaw error of a numerically-controlled (NC) machine tool to overcome the limitations in the existing identification methods.

Technical solutions of this application are described as follows.

In a first aspect, this application provides a method for identifying pitch error and yaw error of a numerically-controlled (NC) machine tool, comprising:

(S1) acquiring a Cartesian coordinate system of a target machine tool;

(S2) setting each axis of the Cartesian coordinate system as movement axis; wherein each movement axis has three measurement trajectories, and the three measurement trajectories are mutually parallel to a corresponding axis, and not on the same plane;

(S3) selecting an axis of the Cartesian coordinate system as the movement axis; and obtaining positioning error data between an actual operation measurement point and an ideal operation measurement point of the target machine tool, when the target machine tool moves along the three measurement trajectories corresponding to the movement axis; and (S4) according to a spatial angle geometric relationship and the positioning error data, obtaining a pitch error angle and a yaw error angle of the target machine tool.

In an embodiment, one of the three measurement trajectories coincides with the corresponding axis of the Cartesian coordinate system.

In an embodiment, the spatial angle geometric relationship is obtained through steps of: selecting a measurement point from each of the three measurement trajectories in step (S3); wherein measurement points are located at the same distance; connecting the measurement points to form an error plane; projecting a normal vector of the error plane respectively onto two coordinate planes of the Cartesian coordinate system where the movement axis in step (S3) is located to obtain a first projection vector and a second projection vector; and taking an included angle formed by a unit vector of the movement axis and the first projection vector as the pitch error angle, and an included angle formed by the unit vector of the movement axis and the second projection vector as the yaw error angle.

In an embodiment, for the ideal operation measurement point $p_{v_i}^k$ ($l_{uv_i}^k$, $l_{vv_i}^k$, $l_{wv_i}^k$) and the actual operation measurement point $p_{v_i}^{k'}$ ($l_{uv_i}^{k'}$, $l_{vv_i}^{k'}$, $l_{wv_i}^{k'}$), the pitch error angle and the yaw error angle are expressed as follows:

$$\theta_{wv_i} = \arccos \frac{\left(l_{vv_i}^{k2'} - l_{vv_i}^{k1'}\right)\left(l_{uv_i}^{k3'} - l_{uv_i}^{k1'}\right) - \left(l_{vv_i}^{k3'} - l_{vv_i}^{k1'}\right)\left(l_{uv_i}^{k2'} - l_{uv_i}^{k1'}\right)}{\sqrt{\left[\left(l_{vv_i}^{k2'} - l_{vv_i}^{k1'}\right)\left(l_{wv_i}^{k3'} - l_{wv_i}^{k1'}\right) - \left(l_{vv_i}^{k3'} - l_{vv_i}^{k1'}\right)\left(l_{wv_i}^{k2'} - l_{wv_i}^{k1'}\right)\right]^2 + \left[\left(l_{wv_i}^{k2'} - l_{wv_i}^{k1'}\right)\left(l_{uv_i}^{k3'} - l_{uv_i}^{k1'}\right) - \left(l_{wv_i}^{k3'} - l_{wv_i}^{k1'}\right)\left(l_{uv_i}^{k2'} - l_{uv_i}^{k1'}\right)\right]^2}};$$

wherein $l_{uv_i}^k$ represents an ideal operation distance, and $l_{uv_i}^{k'}$ represents an actual operation distance; a superscript k represents a measurement trajectory; u, v and w in a subscript respectively represent an error direction, and each are selected from x, y and z; $v_i$ in the subscript represents a movement direction, wherein i represents an i-th measurement point on a measurement trajectory k; v is selected from x, y and z; and i is taken as 1, 2 . . . .

In an embodiment, under a measurement trajectory general condition, distances between initial points of the three measurement trajectories are expressed as $P_{v_0}{}^{k_1}P_{v_0}{}^{k_2}=(L_{u_{12}}, 0, L_{w_{12}})$ and $P_{v_0}{}^{k_1}P_{v_0}{}^{k_3}=(L_{u_{13}}, 0, L_{w_{13}})$, respectively; and a simplified model of the pitch error angle and the yaw error angle is expressed as follows:

$$\theta_{wv_i} = \arccos \frac{L_{w_{12}} \cdot L_{u_{13}} - L_{w_{13}} \cdot L_{u_{12}}}{\sqrt{\left[\left(l_{vv_i}^{k_2} - l_{vv_i}^{k_1}\right) \cdot L_{w_{13}} - \left(l_{vv_i}^{k_3} - l_{vv_i}^{k_1}\right) \cdot L_{w_{12}}\right]^2 + \left[L_{w_{12}} \cdot L_{u_{13}} - L_{w_{13}} \cdot L_{u_{12}}\right]^2}}.$$

In an embodiment, for a geometric space constituted by points A(0,0,0), B(0, $L_Y$, 0), C(–$L_X$, $L_Y$, 0), D(–$L_X$, 0, 0), E(0, 0, $L_Z$), F(0, $L_Y$, $L_Z$), G(–$L_X$, $L_Y$, $L_Z$) and H(–$L_X$, 0, $L_Z$), when at least one of the three measurement trajectories coincides with an edge of the geometric space, a simplified model of the pitch error angle and the yaw error angle is expressed as follows:

$$\theta_{wv_1} = \arccos \frac{L_Z \cdot L_X}{\sqrt{\left(l_{vv_i}^{k_3} - l_{vv_i}^{k_1}\right)^2 \cdot L_Z^2 + L_Z^2 \cdot L_X^2}}.$$

In an embodiment, whether the $\theta_{wv_i}$ is negative or positive is dependent on) $(1_{vv_i}{}^{k_2'} - 1_{w_i}{}^{k_1'})(1_{wv_i}{}^{k_3'} - 1_{wv_i}{}^{k_1'}) - (1_{vv_i}{}^{k_3'} - 1_{vv_i}{}^{k_4'})(1_{wv_i}{}^{k_2'} - 1_{wv_i}{}^{k_1'})$.

In a second aspect, this application provides a system for identifying pitch error and yaw error of a numerically-controlled (NC) machine tool, comprising:

a coordinate system acquisition module;
a measurement trajectory setting module;
a positioning error data acquisition module; and
an error angle acquisition module;
wherein the coordinate system acquisition module, the measurement trajectory setting module, the positioning error data acquisition module and the error angle acquisition module are connected in sequence;
the coordinate system acquisition module is configured to acquire a Cartesian coordinate system of a target machine tool;
the measurement trajectory setting module is configured to set each axis of the Cartesian coordinate system as a movement axis; wherein each movement axis has three measurement trajectories; and the three measurement trajectories are mutually parallel to a corresponding axis, and are not on the same plane;
the positioning error data acquisition module is configured to select an axis of the Cartesian coordinate system as the movement axis, and obtain positioning error data between an actual operation measurement point and an ideal operation measurement point of the target machine tool when the target machine tool moves along the three measurement trajectories corresponding to the movement axis; and
the error angle acquisition module is configured to obtain a pitch error angle and a yaw error angle of the target machine tool, according to a spatial angle geometric relationship and the positioning error data.

In a third aspect, this application provides a computer-readable storage medium, wherein a computer program is stored on the computer-readable storage medium; and the computer program is configured to be executed by a processor to implement the method mentioned above.

In a fourth aspect, this application provides a computer device, comprising:

a storage medium;
a processor; and
a computer program stored on the storage medium;
wherein the computer program is configured to be executed by the processor to implement the method mentioned above.

Compared with the prior art, this application has the following beneficial effects.

This application optimizes the trajectory measurement and error identification in the traditional method. In the method provided herein, the positioning error of the target machine tool can be directly measured by three straight trajectories parallel to or coinciding with the axis of the machine tool coordinate system. The movement trajectories in the measured space can be selected arbitrarily, and moreover, only three trajectories are required for measurement in each coordinate axis direction, largely alleviating the measurement redundancy. The method provided herein enables the simultaneous identification of the pitch error and the yaw error, reducing the complexity of computation and identification.

DETAILED DESCRIPTION OF EMBODIMENTS

The accompanying drawings are only illustrative, and not intended to limit this application.

It should be noted that described below are merely some embodiments of the disclosure, which are not intended to limit the scope of the application. It should be understood that any other embodiments obtained by those skilled in the art based on the embodiments provided herein without paying creative effort shall fall within the scope of the present application defined by the appended claims.

The terms used herein are merely for the convenience of description of the specific embodiments, and not intended to limit this application. As used herein, the singular terms, such as "a", "the" and "this", are intended to include plural form, unless otherwise specified. In addition, the term "and/or" indicates the inclusion of any and all possible combinations of one or more of the listed items.

Unless otherwise indicated, the same numeral in different drawings refers to the same or similar elements. Technical solutions of this application can be implemented in other manners in addition to those described in the following exemplary embodiments. It should be understood that the terms "first", "second", "third", etc. used herein are only intended to distinguish similar objects, rather than describing a specific sequence or order, or indicating or implying relative importance. For those of ordinary skill in the art, the specific meanings of the above terms in this application can be understood according to specific situations.

As used herein, unless otherwise specified, "a plurality of" means two or more. "A and/or B" includes A, B and a combination thereof. The character "/" generally means "or". This application will be further elaborated below in conjunction with the accompanying drawings and embodiments.

In order to overcome the limitations in the existing identification methods, this application provides a method for identifying pitch error and yaw error of a NC machine tool, which will be illustrated with reference to the accompanying drawings and embodiments.

Embodiment 1

Figure 1:
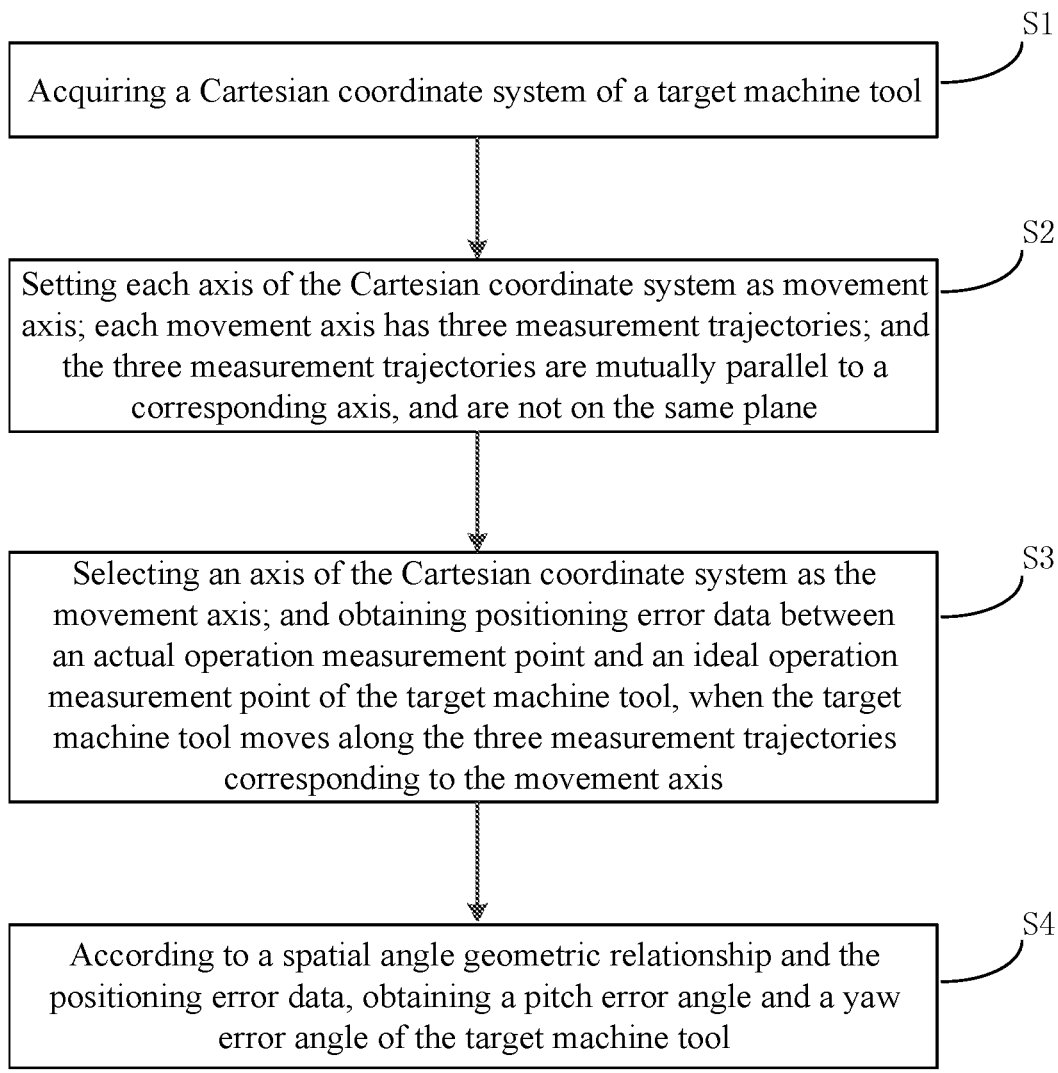
FIG. 1 is a flowchart of a method for identifying pitch error and yaw error of a numerically-controlled (NC) machine tool according to an embodiment of this application.

Referring to an embodiment shown in FIG. 1, a method for identifying pitch error and yaw error of a numerically-controlled (NC) machine tool is performed as follows.

(S1) A Cartesian coordinate system of a target machine tool is acquired.

(S2) Each axis of the Cartesian coordinate system as movement axis, where each movement axis has three measurement trajectories. The three measurement trajectories are mutually parallel to a corresponding axis, and are not on the same plane.

(S3) An axis of the Cartesian coordinate system is selected as the movement axis. Positioning error data between an actual operation measurement point and an ideal operation measurement point of the target machine tool is obtained, when the target machine tool moves along the three measurement trajectories corresponding to the movement axis.

(S4) According to a spatial angle geometric relationship and the positioning error data, a pitch error angle and a yaw error angle of the target machine tool are obtained.

Compared with the prior art, this application has the following beneficial effects.

This application optimizes the trajectory measurement and error identification in the traditional method. In the method provided herein, the positioning error of the target machine tool can be directly measured by three straight trajectories parallel to or coinciding with the axis of the machine tool coordinate system. The movement trajectories in the measured space can be selected arbitrarily, and moreover, only three trajectories are required for measurement in each coordinate axis direction, largely alleviating the measurement redundancy. The method provided herein enables the simultaneous identification of the pitch error and the yaw error, reducing the complexity of computation and identification.

In this embodiment, one of the three measurement trajectories coincides with the corresponding axis of the Cartesian coordinate system.

In this embodiment, the positioning error data is identified and evaluated according to the international standard ISO230-2 published by international standardization organization (ISO), which are described as follows.

1. Positional deviation is a positioning error measured by a measuring apparatus, and equals to a difference obtained by subtracting a target position Pi from an actual position $P_{ij}$, namely $x_{ij}=P_{ij}-P_i$.

2. Mean unidirectional positional deviation is a mean of deviations at a certain point that are measured for n times, namely $$\bar{x_i}\uparrow = \frac{1}{n}\sum_{j=1}^{n}x_{ij}\uparrow$$

(positive direction) and $$\bar{x_i}\downarrow = \frac{1}{n}\sum_{j=1}^{n}x_{ij}\downarrow$$

(negative direction).

3. Mean bi-directional positional deviation (described point) is a mean of a positive-direction mean positional deviation and a negative-direction mean positional deviation of a certain point, namely $$\bar{x_i} = \frac{\bar{x_i}\uparrow + \bar{x_i}\downarrow}{2}.$$

4. Reversal value is a difference obtained by subtracting the negative-direction mean positional deviation from the positive-direction mean positional deviation, namely $B_i = \bar{x_i}\uparrow - \bar{x_i}\downarrow$.

5. Mean reversal value is a mean of the reversal values for m times at a certain point, namely $$\bar{B} = \frac{1}{m}\sum_{i=1}^{m}B_i.$$

6. Estimator for unidirectional axis repeatability of positioning is a standard deviation of the positional deviations at a certain point, namely $$S_i\uparrow = \sqrt{\frac{1}{n-1}\sum(x_{ij}\uparrow - \bar{x_i})^2}$$

(positive direction) and $$S_i\downarrow = \sqrt{\frac{1}{n-1}\sum(x_{ij}\downarrow - \bar{x_i}\downarrow)^2}$$

(negative direction).

7. Unidirectional repeatability of positioning (described point) is 4 times the estimator for unidirectional axis repeatability of positioning at a certain point, namely $R_i\uparrow=4S_i\uparrow$ (positive direction) and $R_i\downarrow=4S_i\downarrow$(negative direction).

8. Bi-directional repeatability of positioning (described point) is expressed as: $R_i=\max[2S_i\uparrow+2S_i\downarrow+|B_i|;R_i\uparrow; R_i\downarrow]$.

9. Bi-directional repeatability of positioning (described axis) is expressed as: $R=\max[R_i]$.

10. Bi-directional systematic positional deviation is expressed as: $E=\max[\bar{x}_i\uparrow; \bar{x}_i\downarrow]-\min[\bar{x}_i\uparrow; \bar{x}_i\downarrow]$.

11. Mean bi-directional positional deviation (described axis) is expressed as: $M=\max[\bar{\bar{x}}_i]-\min[\bar{\bar{x}}_i]$.

12. Bi-directional accuracy of positioning (described axis) is expressed as: $A=\max[\bar{x}_i\uparrow+2S_i\uparrow; \bar{x}_i\downarrow+2S_i\downarrow]-\min[\bar{x}_i\uparrow-2S_i\uparrow; \bar{x}_i\downarrow-2S_i\downarrow]$.

In this embodiment, the spatial angle geometric relationship is obtained as follows. A measurement point is selected from each of the three measurement trajectories in step (S3), where measurement points are located at the same distance. The measurement points are connected to form an error plane. A normal vector of the error plane is respectively projected onto two coordinate planes of the Cartesian coordinate system where the movement axis in step (S3) is locate to obtain a first projection vector and a second projection vector. An included angle formed by a unit vector of the movement axis and the first projection vector is taken as the pitch error angle and an included angle formed by the unit vector of the movement axis and the second projection vector is taken as the yaw error angle.

Figure 2:
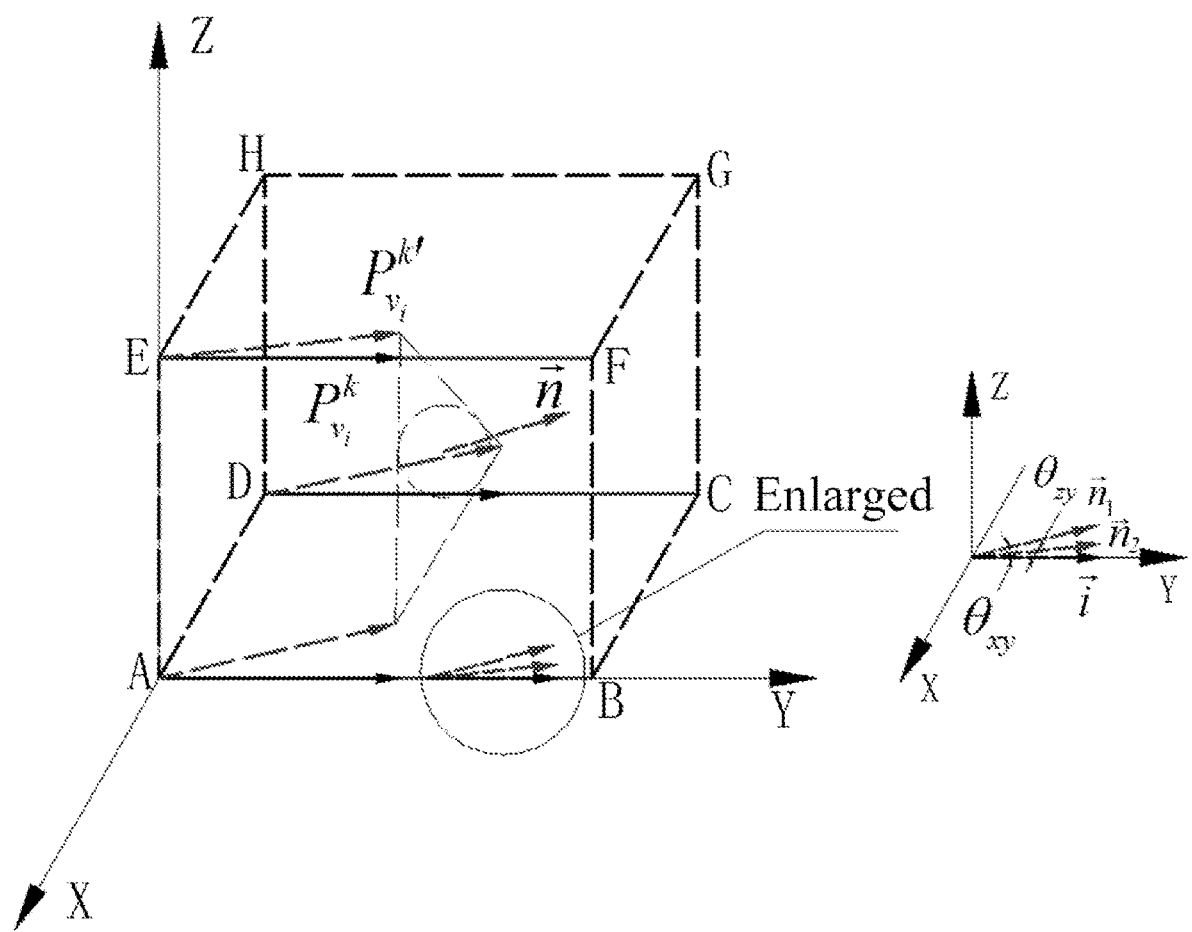
FIG. 2 schematically shows a principle of the pitch error and yaw error identification method according to an embodiment of this application.

Referring to an embodiment shown in FIG. 2, a laser interferometer is employed to obtain positioning error data of each of the three measurement trajectories. A measurement point is selected from each of the three measurement trajectories in step (S3), where measurement points are located at the same distance. The measurement points are connected to form an error plane. A normal vector n of the error plane is respectively projected on to coordinate planes, i.e., XOY plane and YOZ plane of the Cartesian coordinate system where Y axis is located, so as to obtain a projection vector $n_1$ of the XOY plane and a projection vector $n_2$ of the YOZ plane. An included angle formed by a unit vector i of the Y axis and the projection vector $n_1$ is $\theta_{xy}$, and an included angle formed by a unit vector i of the Y axis and the projection vector $n_2$ is $\theta_{zy}$. $\theta_{zy}$ and $\theta_{xy}$ respectively correspond to the yaw error and the pitch error of the Y axis.

Figure 3:
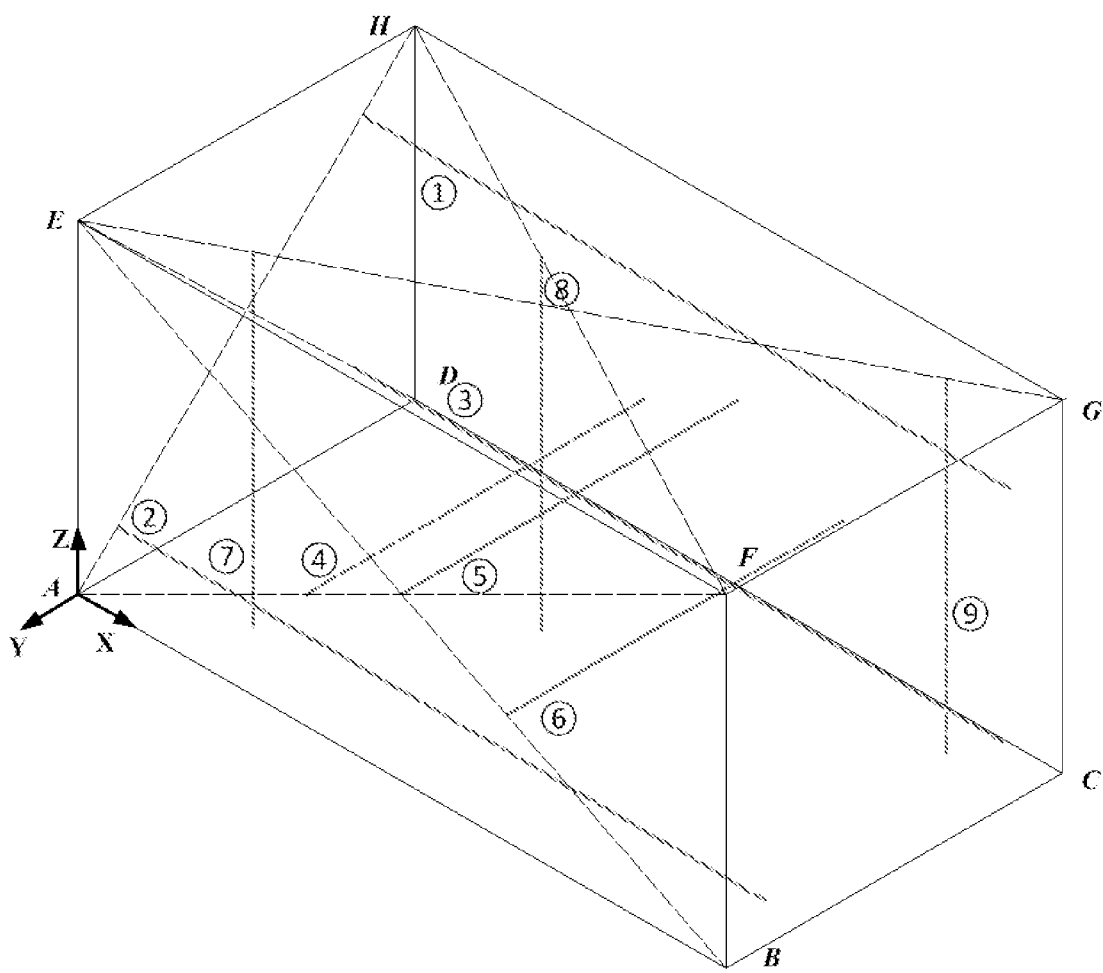
FIG. 3 is a schematic diagram showing a trajectory under a general condition in the pitch error and yaw error identification method according to an embodiment of this application.
Figure 4:
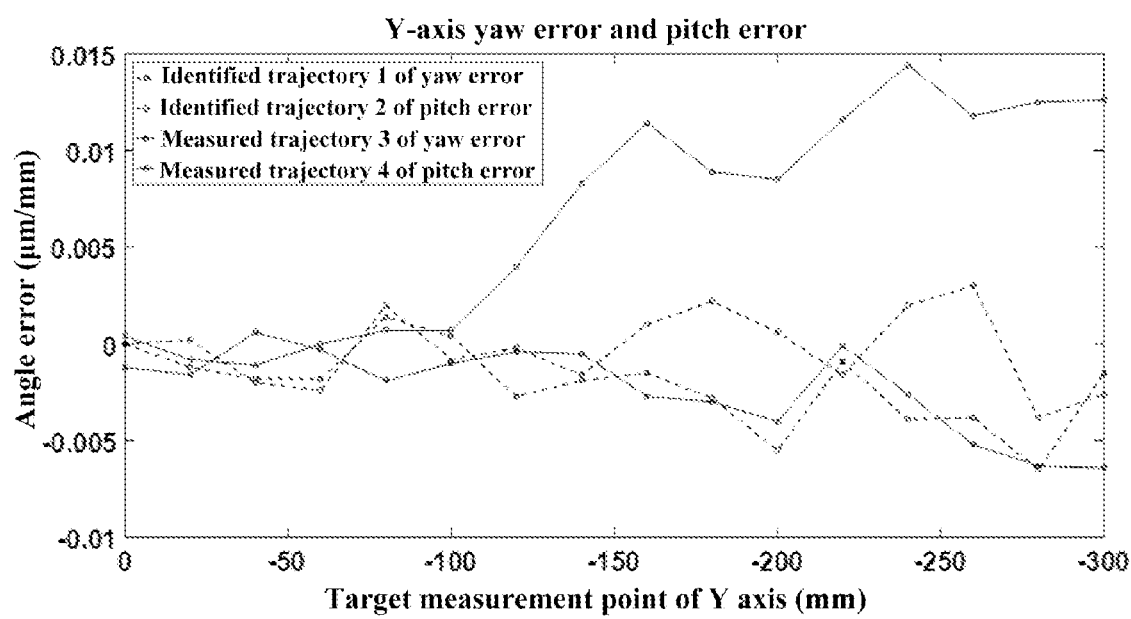
FIG. 4 schematically shows data obtained by implementing the pitch error and yaw error identification method according to an embodiment of this application under the general condition.
Figure 5:
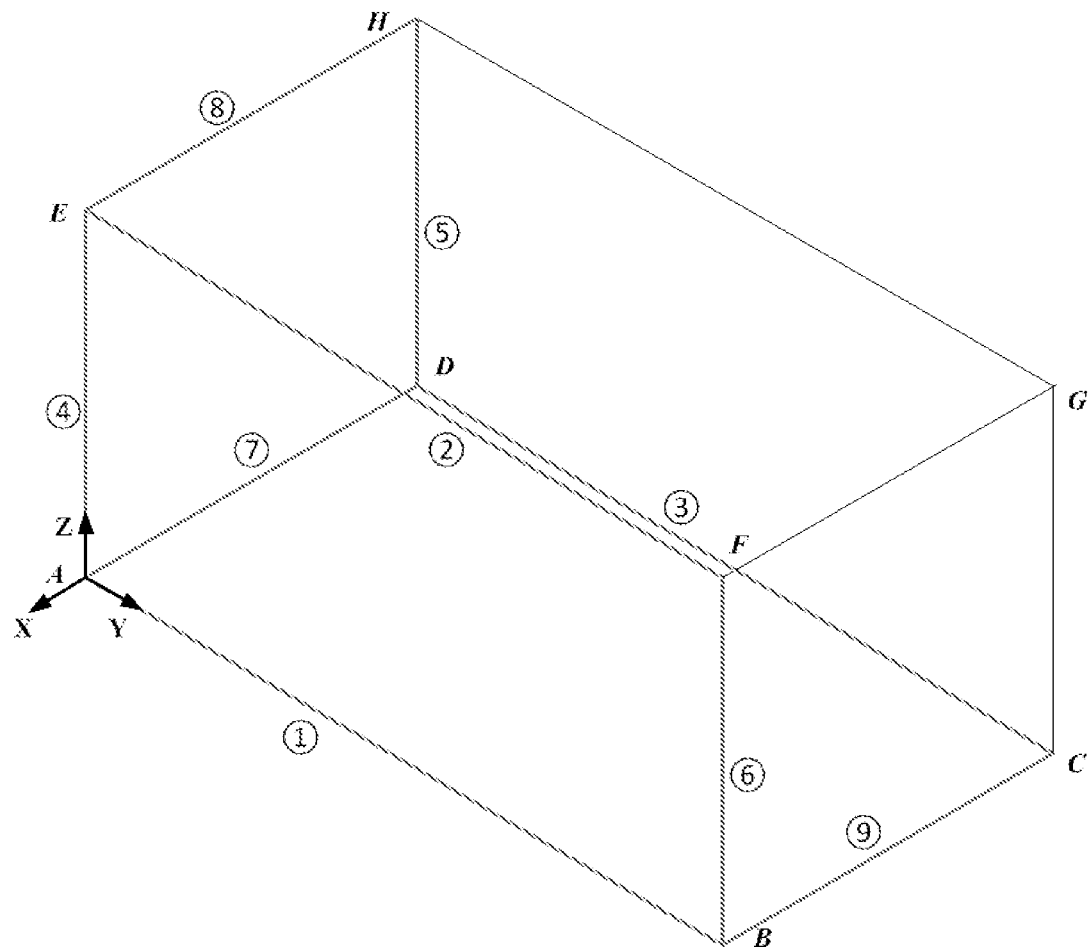
FIG. 5 is a schematic diagram of a trajectory of the pitch error and yaw error identification method according to an embodiment of this application under a special condition.

Referring to FIGS. 3-5, a numerically-controlled machine tool of 1000 mm×500 mm×500 mm is taken as a measurement object. A lower left corner of a front end of a working table of the three-axis numerically-controlled machine tool table is set as an original point of absolute coordinate. A Cartesian coordinate system is established based on the original point. X axis of the Cartesian coordinate system is taken as a movement axis to obtain trajectories 1-3; Y axis of Cartesian coordinate system is taken as the movement axis to obtain trajectories 4-6; and Z axis of the Cartesian coordinate system is taken as the movement axis to obtain trajectories 7-9. The trajectories 1-3 are in a group corresponding to the X axis. The trajectories 4-6 are in a group corresponding to the Y axis. The trajectories 7-9 are in a group corresponding to the Z axis. Each group of three trajectories are parallel to each other or coincides with the corresponding axis of the Cartesian coordinate system. The movement trajectories can be arbitrarily selected in the geometric space to be measured.

In this embodiment, for the ideal operation measurement point $P_{v_i}^k$ ($l_{uv_i}^k$, $l_{vv_i}^k$, $l_{wv_i}^k$) and the actual operation measurement point $P_{v_i}^{k_1}$ ($l_{uv_i}^{k_1}$, $l_{vv_i}^{k_1}$, $l_{wv_i}^{k_1}$), the pitch error angle and the yaw error angle are expressed as follows:

$$\theta_{wv_1} = \arccos \frac{\left(l_{wv_i}^{k_2} - l_{wv_i}^{k_1}\right)\left(l_{uv_i}^{k_3} - l_{uv_i}^{k_1}\right) - \left(l_{wv_i}^{k_3} - l_{wv_i}^{k_1}\right)\left(l_{uv_i}^{k_2} - l_{uv_i}^{k_1}\right)}{\sqrt{\left[\left(l_{vv_i}^{k_2} - l_{vv_i}^{k_1}\right)\left(l_{wv_i}^{k_3} - l_{wv_i}^{k_1}\right) - \left(l_{vv_i}^{k_3} - l_{vv_i}^{k_1}\right)\left(l_{wv_i}^{k_2} - l_{wv_i}^{k_1}\right)\right]^2 + \left[\left(l_{wv_i}^{k_2} - l_{wv_i}^{k_1}\right)\left(l_{uv_i}^{k_3} - l_{uv_i}^{k_1}\right) - \left(l_{wv_i}^{k_3} - l_{wv_i}^{k_1}\right)\left(l_{uv_i}^{k_2} - l_{uv_i}^{k_1}\right)\right]^2}};$$

where $l_{uv_i}^k$ represents an ideal operation distance, and $l_{uv_i}^k$ represents an actual operation distance; a superscript k represents a measurement trajectory; u, v and w in a subscript respectively represent an error direction, and each are selected from x, y and z; $v_i$ in the subscript represents a movement direction, where i represents an i-th measurement point on a measurement trajectory k; v is selected from x, y and z; and i is taken as 1, 2, . . . .

In this embodiment, whether the $\theta_{wv_i}$ is negative or positive is dependent on $(l_{vv_i}^{k_2'}-l_{vv_i}^{k_1'})(l_{wv_i}^{k_3'}-l_{wv_i}^{k_1'})-(l_{vv_i}^{k_3'}-l_{vv_i}^{k_1'})(l_{wv_i}^{k_2'}-l_{wv_i}^{k_1'})$.

Referring to an embodiment shown in FIG. 3, under a measurement trajectory general condition, distances between initial points of the three measurement trajectories are expressed as $P_{v_0}^{k_1}P_{v_0}^{k_2}=(L_{u_{12}}, 0, L_{w_{12}})$ and $P_{v_0}^{k_1}P_{v_0}^{k_3}=(L_{u_{13}}, 0, L_{w_{13}})$, respectively. A simplified model of the pitch error angle and the yaw error angle is expressed as follows:

$$\theta_{wv_i} = \arccos \frac{L_{w_{12}} \cdot L_{u_{13}} - L_{w_{13}} \cdot L_{u_{12}}}{\sqrt{\left[\left(l_{vv_i}^{k_2} - l_{vv_i}^{k_1}\right)\cdot L_{w_{13}} - \left(l_{vv_i}^{k_3} - l_{vv_i}^{k_1}\right)\cdot L_{w_{12}}\right]^2 + \left[L_{w_{12}} \cdot L_{u_{13}} - L_{w_{13}} \cdot L_{u_{12}}\right]^2}}.$$

In this embodiment, based on the actual measurement condition, a Cartesian coordinate system is established, where point A is selected as an origin point. In an embodiment, a negative direction of the Y-axis is taken as a movement direction to be measured, so as to obtain the positioning error data of each of the trajectories ④-⑥. The data curve of the identified yaw error and the pitch error is compared with the data curve of the actual measured yaw error and the actual measured pitch error, which is demonstrated in FIG. 4. As shown in FIG. 4, a solid line indicates the actual measured value; the dashed line indicates the identification value obtained through the identification model; and the line marked with □ indicates the yaw error, and the line marked with ○ indicates the pitch error. Regarding the yaw error, a maximum difference between the actual measured value and the identified value is 0.007 μm/mm, and regarding the pitch error, a maximum difference between the actual measured value and the identified value is 0.022 μm/mm.

Referring to an embodiment shown in FIG. 5, for a geometric space constituted by points A(0,0,0), B(0, $L_Y$, 0), C($-L_X$, $L_Y$, 0), D($-L_X$, 0, 0), E(0, 0, $L_Z$), F(0, $L_Y$, $L_Z$), G($-L_X$, $L_Y$, $L_Z$) and H($-L_X$, 0, $L_Z$), when at least one of the three measurement trajectories coincides with an edge of the geometric space, a simplified model of the pitch error angle and the yaw error angle is expressed as follows:

$$\theta_{wv_i} = \arccos \frac{L_Z \cdot L_X}{\sqrt{\left(l_{vv_i}^{k_3} - l_{vv_i}^{k_1}\right)^2 \cdot L_Z^2 + L_Z^2 \cdot L_X^2}}.$$

Figure 6:
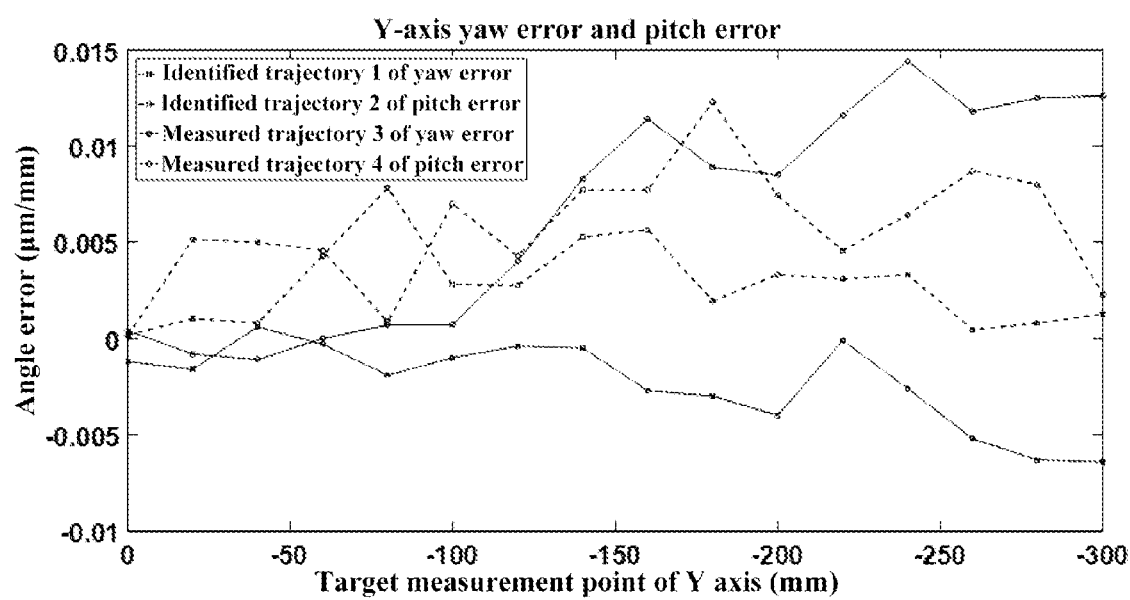
FIG. 6 schematically shows data obtained by implementing the pitch error and yaw error identification method according to an embodiment of this application under the special condition.

In this embodiment, based on the actual measurement condition, a Cartesian coordinate system is established, where point A is selected as an origin point. In an embodiment, a negative direction of the Y-axis is taken as a movement direction to be measured, so as to obtain the positioning error data of each of the trajectories 4-6. The data curve of the identified yaw error and the pitch error is compared with the data curve of the actual measured yaw error and the actual measured pitch error, which is demonstrated in FIG. 6. As shown in FIG. 6, a solid line indicates the actual measured value; the dashed line indicates the identification value obtained through the identification model; and the line marked □ with indicates the yaw error, and the line marked with ○ indicates the pitch error. Regarding the yaw error, a maximum difference between the actual measured value and the identified value is 0.005 μm/mm, and regarding the pitch error, a maximum difference between the actual measured value and the identified value is 0.016 μm/mm.

Embodiment 2

Figure 7:
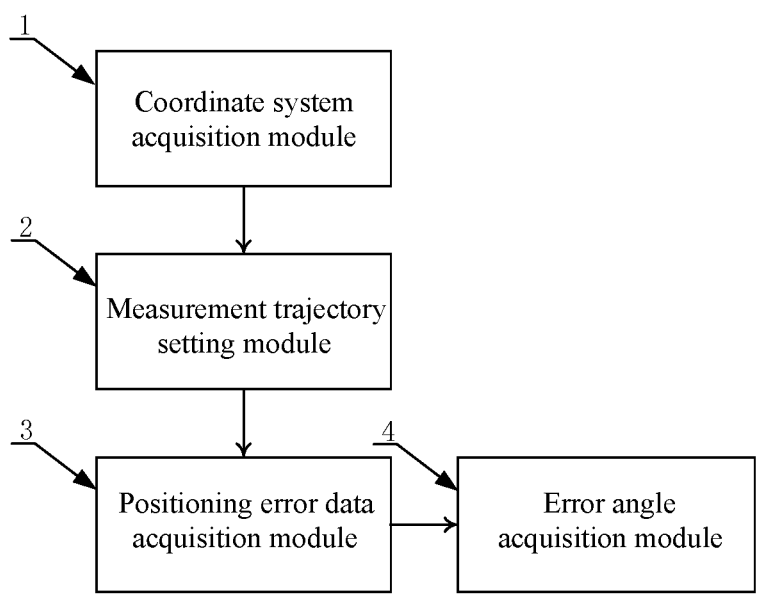
FIG. 7 is a schematic diagram of a system for identifying pitch error and yaw error of a NC machine tool according to an embodiment of this application.

Referring to an embodiment shown in FIG. 7, provided herein is a system for identifying pitch error and yaw error of a numerically-controlled (NC) machine tool, which includes a coordinate system acquisition module 1, a measurement trajectory setting module 2, a positioning error data acquisition module 3 and an error angle acquisition module 4.

The coordinate system acquisition module 1, the measurement trajectory setting module 2, the positioning error data acquisition module 3 and the error angle acquisition module 4 are connected in sequence.

The coordinate system acquisition module 1 is configured to acquire a Cartesian coordinate system of a target machine tool.

The measurement trajectory setting module 2 is configured to set each axis of the Cartesian coordinate system as movement axis, where each movement axis has three measurement trajectories. The three measurement trajectories are mutually parallel to a corresponding axis, and not on the same plane.

The positioning error data acquisition module 3 is configured to select an axis of the Cartesian coordinate system as the movement axis, and obtain positioning error data between an actual operation measurement point and an ideal operation measurement point of the target machine tool when the target machine tool moves along the three measurement trajectories corresponding to the movement axis.

The error angle acquisition module 4 is configured to obtain a pitch error angle and a yaw error angle of the target machine tool according to a spatial angle geometric relationship and the positioning error data.

Embodiment 3

A computer-readable storage medium provided herein. A computer program is stored on the computer-readable storage medium. The computer program is configured to be executed by a processor to implement the method described in Embodiment 1.

Embodiment 4

A computer device is provided herein, including a storage medium, a processor, and a computer program stored on the storage medium to be executed by the processor. The computer program is configured to be executed by the processor to implement the method described in Embodiment 1.

Obviously, described above are merely illustrative of the technical solutions of this application, and are not intended to limit the scope of the application. Though this application has been described in detail above, those skilled in the art can still make various changes, modifications or replacements to the embodiments of this application.

It should be noted that those modifications, replacements and changes made without departing from the spirit of the application shall fall within the scope of the present application defined by the appended claims.

What is claimed is:

1. A method for identifying pitch error and yaw error of a numerically-controlled (NC) machine tool, comprising:
   (S1) acquiring a Cartesian coordinate system of a target machine tool;
   (S2) setting each axis of the Cartesian coordinate system as movement axis; wherein each of the movement axis has three measurement trajectories; and the three measurement trajectories are mutually parallel to a corresponding axis, and are not on the same plane;
   (S3) selecting one of the axis of the Cartesian coordinate system as the movement axis; and obtaining positioning error data between an actual operation measurement point and an ideal operation measurement point of the target machine tool, when the target machine tool moves along the three measurement trajectories corresponding to the movement axis; and
   (S4) according to a spatial angle geometric relationship and the positioning error data, obtaining a pitch error angle and a yaw error angle of the target machine tool;
   wherein the spatial angle geometric relationship is obtained through steps of:
   selecting the actual operation measurement point from each of the three measurement trajectories in step (S3) to form a plurality of actual operation measurement points;
   connecting the plurality of actual operation measurement points to form an error plane;
   projecting a normal vector of the error plane respectively onto two coordinate planes of the Cartesian coordinate system where the movement axis in step (S3) is located to obtain a first projection vector and a second projection vector; and
   taking an included angle formed by a unit vector of the movement axis and the first projection vector as the pitch error angle, and an included angle formed by the unit vector of the movement axis and the second projection vector as the yaw error angle;
   for the ideal operation measurement point $P_{v_i}^k$ ($l_{uv_i}^k$, $l_{vv_i}^k$, $l_{wv_i}^k$) and the actual operation measurement point $P_{v_i}^{k'}$ ($l_{uv_i}^{k'}$, $l_{vv_i}^{k'}$, $l_{wv_i}^{k'}$), the pitch error angle and the yaw error angle are expressed as follows:

$$\theta_{wv_1} = \arccos \frac{\left(l_{wv_i}^{k_2} - l_{wv_i}^{k_1}\right)\left(l_{uv_i}^{k_3} - l_{uv_i}^{k_1}\right) - \left(l_{wv_i}^{k_3} - l_{wv_i}^{k_1}\right)\left(l_{uv_i}^{k_2} - l_{uv_i}^{k_1}\right)}{\sqrt{\left[\left(l_{vv_i}^{k_2} - l_{vv_i}^{k_1}\right)\left(l_{wv_i}^{k_3} - l_{wv_i}^{k_1}\right) - \left(l_{vv_i}^{k_3} - l_{vv_i}^{k_1}\right)\left(l_{wv_i}^{k_2} - l_{wv_i}^{k_1}\right)\right]^2 + \left[\left(l_{wv_i}^{k_2} - l_{wv_i}^{k_1}\right)\left(l_{uv_i}^{k_3} - l_{uv_i}^{k_1}\right) - \left(l_{wv_i}^{k_3} - l_{wv_i}^{k_1}\right)\left(l_{uv_i}^{k_2} - l_{uv_i}^{k_1}\right)\right]^2}};$$

wherein $l_{uv_i}^k$ represents an ideal operation distance, and $l_{uv_i}^{k'}$ represents an actual operation distance;

a superscript k represents a measurement trajectory of the three measurement trajectories;

u, v and w in a subscript respectively represent an error direction, and each are selected from x, y and z axes;

$v_i$ in the subscript represents a movement direction, wherein i represents an i-th measurement point on a measurement trajectory k of the three measurement trajectories;

v is selected from the x, y and z axes; and i is 1, 2, . . . .

2. The method of claim 1, wherein one of the three measurement trajectories coincides with the corresponding axis of the Cartesian coordinate system.

3. The method of claim 1, wherein whether the $\theta_{wv_i}$ is negative or positive is dependent on $(l_{vv_i}^{k_2'} - l_{vv_i}^{k_1'})(l_{wv_i}^{k_3'} - l_{wv_i}^{k_1'}) - (l_{vv_i}^{k_3'} - l_{vv_i}^{k_1'})(l_{wv_i}^{k_2'} - l_{wv_i}^{k_1'})$.

4. A non-transitory computer-readable storage medium, wherein a computer program is stored on the non-transitory computer-readable storage medium; and the computer program is configured to be executed by a processor to implement the method of claim 1.

5. A computer device, comprising:
a non-transitory storage medium;
a processor; and
a computer program stored on the non-transitory storage medium;
wherein the computer program is configured to be executed by the processor to implement the method of claim 1.

6. A system for identifying pitch error and yaw error of a numerically-controlled (NC) machine tool, comprising:
a coordinate system acquisition module;
a measurement trajectory setting module;
a positioning error data acquisition module; and
an error angle acquisition module;
wherein the coordinate system acquisition module, the measurement trajectory setting module, the positioning error data acquisition module and the error angle acquisition module are connected in sequence;
the coordinate system acquisition module is configured to acquire a Cartesian coordinate system of a target machine tool;
the measurement trajectory setting module is configured to set each axis of the Cartesian coordinate system as movement axis; wherein each of the movement axis has three measurement trajectories; and the three measurement trajectories are mutually parallel to a corresponding axis, and are not on the same plane;
the positioning error data acquisition module is configured to select one of the axis of the Cartesian coordinate system as the movement axis, and obtain positioning error data between an actual operation measurement point and an ideal operation measurement point of the target machine tool when the target machine tool moves along the three measurement trajectories corresponding to the movement axis; and
the error angle acquisition module is configured to obtain a pitch error angle and a yaw error angle of the target machine tool according to a spatial angle geometric relationship and the positioning error data;
wherein the spatial angle geometric relationship is obtained through steps of:
selecting the actual operation measurement point from each of the three measurement trajectories in the positioning error data acquisition module, to form a plurality of actual operation measurement points;
connecting the plurality of actual operation measurement points to form an error plane;
projecting a normal vector of the error plane respectively onto two coordinate planes of the Cartesian coordinate system where the movement axis is located to obtain a first projection vector and a second projection vector; and
taking an included angle formed by a unit vector of the movement axis and the first projection vector as the pitch error angle, and an included angle formed by the unit vector of the movement axis and the second projection vector as the yaw error angle;
for the ideal operation measurement point $P_{v_i}^{k}$ ($l_{uv_i}^{k}$, $l_{vv_i}^{k}$, $l_{wv_i}^{k}$) and the actual operation measurement point $P_{v_i}^{k'}$ ($l_{uv_i}^{k'}$, $l_{vv_i}^{k'}$, $l_{wv_i}^{k'}$), the pitch error angle and the yaw error angle are expressed as follows:

$$\theta_{wv_1} = \arccos \frac{\left(l_{wv_i}^{k_2} - l_{wv_i}^{k_1}\right)\left(l_{uv_i}^{k_3} - l_{uv_i}^{k_1}\right) - \left(l_{wv_i}^{k_3} - l_{wv_i}^{k_1}\right)\left(l_{uv_i}^{k_2} - l_{uv_i}^{k_1}\right)}{\sqrt{\left[\left(l_{vv_i}^{k_2} - l_{vv_i}^{k_1}\right)\left(l_{wv_i}^{k_3} - l_{wv_i}^{k_1}\right) - \left(l_{vv_i}^{k_3} - l_{vv_i}^{k_1}\right)\left(l_{wv_i}^{k_2} - l_{wv_i}^{k_1}\right)\right]^2 + \left[\left(l_{wv_i}^{k_2} - l_{wv_i}^{k_1}\right)\left(l_{uv_i}^{k_3} - l_{uv_i}^{k_1}\right) - \left(l_{wv_i}^{k_3} - l_{wv_i}^{k_1}\right)\left(l_{uv_i}^{k_2} - l_{uv_i}^{k_1}\right)\right]^2}};$$

wherein $l_{uv_i}^{k}$ represents an ideal operation distance, and $l_{uv_i}^{k'}$ represents an actual operation distance;

a superscript k represents a measurement trajectory of the three measurement trajectories;

u, v and w in a subscript respectively represent an error direction, and each are selected from x, y and z axes;

$v_i$ in the subscript represents a movement direction, wherein i represents an i-th measurement point on a measurement trajectory k of the three measurement trajectories;

v is selected from the x, y and z axes; and i is 1, 2, . . . .

\* \* \* \* \*